Patented Dec. 9, 1924.

1,518,872

UNITED STATES PATENT OFFICE.

ALADAR PACZ, OF CLEVELAND HEIGHTS, OHIO.

PROCESS OF PRODUCING FLUORIDES.

No Drawing. Application filed April 16, 1920. Serial No. 374,262.

*To all whom it may concern:*

Be it known that I, ALADAR PACZ, a citizen of the United States, residing at Cleveland Heights, in the county of Cuyahoga and State of Ohio, have invented a certain new and useful Improvement in Processes of Producing Fluorides, of which the following is a full, clear, and exact description.

This invention relates to the production of a substitute for cryolite in the production of aluminum, the manufacture of glass, the enameling of metals and other articles, and the production of various by-products of value in the arts. In my former application filed March 18, 1920, Serial No. 366,967, I described and claimed an improved electrolyte for aluminum production and a method of preparing the same from sodium silico-fluoride, which is a very cheap material, being either a by-product or the result of a by-product in the manufacture of the fertilizers known as "super-phosphates." However, this sodium salt is not the only product that can be made, and the reduction of aluminum is not the only purpose for which the product (whether cryolite or not) can be used.

In my former application I showed that when sodium silico-fluoride was mixed with aluminum powder in the correct proportions, and added to a bath of molten metal under conditions which prevented the segregation of the ingredients, the following reaction occurred:

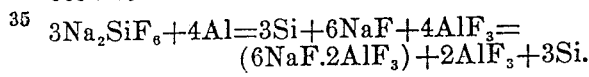

The resulting silicon alloys with the metal of the bath while the non-metallic product constitutes a molten slag consisting essentially of cryolite mixed with two extra molecules of aluminum fluoride which is peculiarly valuable for aluminum reduction. However, I find that the corresponding double fluorides of silicon with magnesium, calcium, barium, strontium and even aluminum are readily and cheaply available and that when treated with aluminum powder in the manner above described the following reactions occur:

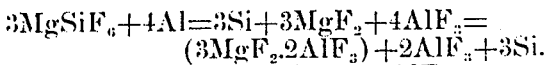
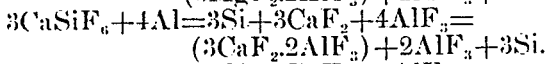
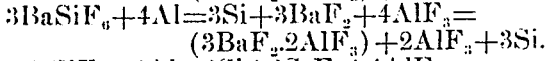
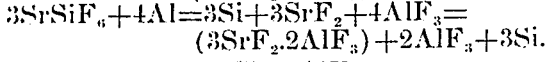
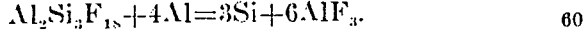

All the above named substances are of value in the manufacture of opaque and opalescent glass, enameling, etc., and for this purpose can be used in place of the decreasingly available natural cryolite. In some cases these materials can be employed the same as natural cryolite but in other cases they may be fortified with other substances in which they are deficient, for example by the addition of some simple fluoride as fluor spar to combine with the excess aluminum fluoride.

The pure aluminum fluoride produced by the last reaction is of peculiar value in aluminum reduction as has long been known and the only reason for its small use hitherto has been its scarcity and high cost. My improvements overcome this defect. In addition the silicon produced by the above reaction is of considerable independent value especially considering that the reaction can be caused to occur in a bath of any metal which is liquid at the necessary temperature, say from about 600° to about 1500° C. In fact, this can be effected in a bath composed solely of silicon.

The raw materials above named can be obtained on the open market, at least in some countries; and while any suitable source can be availed of, I prefer to make the same either directly or indirectly from the fumes of hydro-fluo-silicic acid produced when phosphate rock is treated with sulphuric acid in the manufacture of fertilizer. When not allowed to go to waste these fumes have sometimes been absorbed in a solution of common salt, such as sea-water, or by stirring salt into a solution of the fumes with the production of sodium silico-fluoride, which is sometimes thrown away and sometimes marketed in small quantities. In order to make any one of the above mentioned salts it is merely necessary to substitute for the sea-salt a suitable compound of one of the other metals, such as the sulphate, chloride, oxide or carbonate of magnesium; the chloride, oxide, or carbonate of calcium, barium, or strontium; or the sulphate of aluminum, these being the most convenient forms in which these substances occur. If it is inconvenient to perform this action directly, the same result can be attained indirectly by first making the sodium salt and then using it to precipitate the substance desired from any suitable solution or suspension of the metal in question, since all the other silico-fluorides are less soluble than the sodium salt.

The double fluoride so produced is then mixed with aluminum powder in the correct proportions, and compressed or agglutinated into lumps, briquettes, chunks, or pellets so as to prevent the materials from becoming segregated either prior to or during their immersion in the molten bath. This molten bath has the effect of heating the mixture to the reacting temperature without access of air, the resulting silicon alloying with any other metal which may be present, and the fluorine compounds rise to the top as a molten slag.

While I have mentioned certain uses for which the product of my newly discovered reaction is particularly valuable at the present time, I likewise claim and secure the same for any other use to which it may be applicable, and restrict myself in nowise except as specifically set forth in my claims.

Having thus described my invention, what I claim is:—

1. The process of making aluminum fluoride which consists of reacting with metallic aluminum upon aluminum silico-fluoride at an elevated temperature.

2. The process of making metallic fluorides of which aluminum is at least one which consists in reacting with metallic aluminum upon a silico-fluoride at a melting temperature.

3. The process of making pure aluminum fluoride which contains the step of replacing the silicon of metallic aluminum silico-fluoride with aluminum at a melting temperature.

4. The process of liberating free silicon which contains the step of heating together powdered aluminum and any metallic silico-fluoride under conditions which prevent segregation of the same or access of air thereto.

5. The method of producing aluminum fluoride which contains the steps of first precipitating a soluble salt of aluminum with a soluble compound of silicon and fluorine whereby aluminum silico fluoride is produced, and then replacing the silicon therein by treatment with metallic aluminum at an elevated temperature.

In testimony whereof, I hereunto affix my signature.

ALADAR PACZ.